W. A. DE HART AND J. A. WATT.
CORK OR STOPPER EXTRACTOR.
APPLICATION FILED APR. 21, 1914.

1,306,848.

Patented June 17, 1919.

WITNESSES
Geo. A. Senior
Emil Forster Jr.

William A. De Hart
James A. Watt,
INVENTORS,

BY
ATTORNEYS.

UNITED STATES PATENT OFFICE.

WILLIAM A. DE HART AND JAMES A. WATT, OF NEW YORK, N. Y.

CORK OR STOPPER EXTRACTOR.

1,306,848.        Specification of Letters Patent.     Patented June 17, 1919.

Application filed April 21, 1914. Serial No. 833,477.

*To all whom it may concern:*

Be it known that we, WILLIAM A. DE HART, a citizen of the United States, residing in the borough of Manhattan, city and State of New York, and JAMES A. WATT, a subject of the King of Great Britain, residing in the borough of Manhattan, city and State of New York, have invented certain new and useful Improvements in Cork or Stopper Extractors, of which the following is a full and clear specification.

The object of the present invention is to produce a simple, effective and inexpensive extractor for corks or stoppers, in which the extractor is permanently attached to the cork or stopper.

To this end the invention comprises a cork or stopper with an extractor bail or loop attached thereto at two points by means of an anchoring device embedded and concealed in the body of the cork or stopper. The anchoring device passes transversely through the cork or stopper in the same general plane as the extractor bail or loop. In the preferred form of our invention the anchoring device is made of a spiral wire which is screwed transversely into the body of the cork or stopper and engages hooks or eyes formed on the arms of the bail or loop, which are embedded in the upper surface of the cork or stopper sufficiently to engage the anchoring device. The hooks or eyes upon the extractor bail or loop are preferably arranged in the same general plane as the body of the bail or loop and the anchoring device. The spiral wire anchoring device screwed into the body of the cork or stopper, encompasses or encircles parts of the body of the cork or stopper in a manner similar to a series of open rings so that the strength of the cork or stopper is not injured and the holding strength of the anchoring device is equivalent to the strength of the unbroken material of which the cork or stopper is made. In fact, in some respects the spiral wire anchoring device more closely secures together the parts of the body of the cork or stopper. The spiral wire anchoring device is also a spring in effect presented transversely of the cork or stopper, so as not to interfere with the compressibility of the cork or stopper.

In the preferred form the spiral wire anchoring device extends approximately the whole width of the cork or stopper, the ends being cut off just short of the side surface of the cork or stopper, so as to have no metal exposed in said surface. With the anchoring device extending entirely across the cork and having such natural strength as above referred to, the engagement of the extractor bail or loop at two points produces a cork with attached extractor of the maximum strength and efficiency.

In applying our invention to some forms of corks or stoppers, particularly large sizes, we sometimes employ two spiral wire anchoring devices inserted from opposite sides of the cork or stopper and each anchoring device engaging one arm of the extractor bail or loop.

The extractor bail or loop may have its arms bent at a slight angle adjacent to the top surface of the cork or stopper to enable the bail or loop to lie flat upon the top of the cork when not in use, the attachment between the bail or loop and the anchoring device being a hinge joint which enables the bail or loop to be presented outwardly for pulling a cork or stopper or to be placed in close contact with the top surface of the cork or stopper. While the preferred form of the invention enables the employment of separately formed anchoring device and bail or loop, these parts can, if preferred, be made of a single piece of wire, the anchoring portion of the wire being in the form of a spiral which is first inserted into the cork and the bail or loop portion extending from one end thereof at one side of the cork, being formed at its other end with an attaching hook which can be inserted into the top surface of the cork or stopper and engaged with a coil of the anchoring device.

The improved extractor for corks or stoppers may be made in various forms and in order that our invention may fully be understood, we will first describe the same with reference to the accompanying drawings and afterward point out the novelty more particularly in the annexed claims.

In said drawings—

Figure 1:
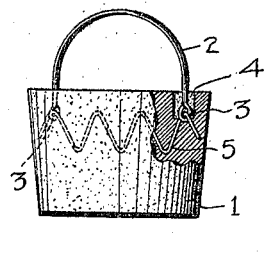
Figure 1 is a side elevation of the preferred form of our invention.
Figure 2:
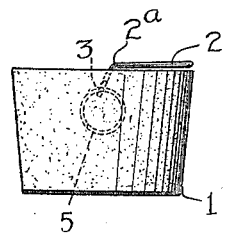
Fig. 2 is a similar view of the same taken at right angles from the view shown in Fig. 1.

Referring to Figs. 1 and 2, 1 is the body of a cork or stopper of any desired size or shape made of natural or molded cork or other material which may be found suitable for applying the improved cork extractor. 2 is an extractor bail or loop formed of a suitable length of wire with anchoring eyes 3 at the ends of the two loop arms. These ends of the loop arms are pressed into the top surface of the cork or stopper 1 through slits 4 which are punched into the cork or stopper with a suitable blade to a depth to permit the eyes 3 to be pressed down to the plane of the anchoring device which is to engage the eyes. The location of the slits 4 in the top of the cork, is in or adjacent to the central vertical transverse plane of the cork or stopper, and the distance of the slits from the edge of the cork or stopper and from each other, are dependent upon the size of the cork or stopper and the size of the wire from which the bail or loop is formed. When these points are determined from practical considerations, the pitch of the spiral wire anchoring device is fixed to correspond therewith.

5 is a spiral wire anchoring device which is inserted at one side of the cork and screwed transversely through the cork so as to engage the eyes 3 as shown in Fig. 1. The spiral anchoring member is so inserted that its opposite ends are slightly inside of the side surface of the cork or stopper. It is designed that such anchoring member be inserted by machine and in the operation the spiral wire will be driven into the cork, so as to leave the leading end a little inside of one surface, and after the insertion the wire will be cut off a little inside of the other surface of the cork or stopper. The connection between anchoring member 5 and the bail or loop 2 is a hinge connection. The bail or loop 2 is preferably formed with an angular bend indicated at 2ª in both arms of the bail or loop, adjacent to its attached ends, such bend being transversely of the general plane of the bail or loop and sufficient to enable the bail or loop to rest flat against the top surface of the cork when folded over as shown in Fig. 2. The movement of the bail from its position in Fig. 2 to its extended position as shown in Fig. 1, is permitted by the yielding nature of the cork. But in some cases it may be preferred to further slit the cork in the planes of movement of the bail arms to allow more freedom in the movement.

Figure 4:
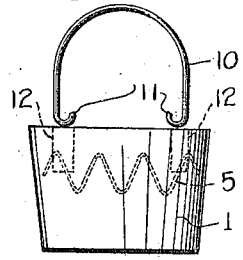
Figs. 4, 5, 6, 7, 8, 9 and 10 are views similar to Fig. 1 of modifications of our invention.

In the modification shown in Fig. 4, the bail or loop 10 is formed with inturned hook ends 11, which from their relation to the main body of the bail are enabled to spring into engagement with the anchoring member 5, which is previously inserted in the cork or stopper 1. In this form of the device the spiral anchoring wire 5 is first inserted in the proper position in the cork and the bail or loop member 10, with its hook ends 11, is pressed down through slits 12 in the body of the cork or stopper until the hook ends 11 spring over and engage the two coils of the anchoring member 5 which will lock the bail or loop in operative connection with the stopper.

Figure 3:
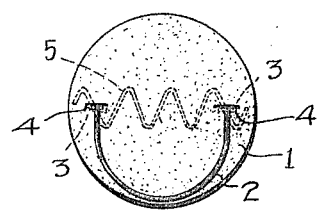
Fig. 3 is a plan view of the same.
Figure 5:
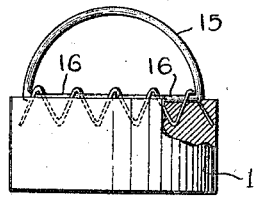

In Fig. 5 we have shown a slightly different form of our invention in which the spiral wire anchoring member 5 is passed transversely through the cork or stopper member 1, closer to the top surface of the stopper, so that the extreme upper edge of the coils of the anchoring member will appear above the surface. In this form we may employ various styles of extractor bails or loops engaging the anchoring member at one, two or more points. In Fig. 5 we have shown a wire bail 15 having inturned ends 16, each of which passes beneath several of the exposed coils of the anchoring device 5, thereby effectively hinging the bail or loop member 15 to the cork and permitting the bail to be turned down flat against the top surface of the cork or stopper. It will be apparent that with the anchoring member 5 inserted in this manner other forms of bails or loops may be employed, either a simple closed loop or ring engaging the anchoring member at the center of the cork or bails, or loops with separated arms engaging the anchoring member at two points, as for instance is shown in Figs. 1 and 3.

Figure 6:
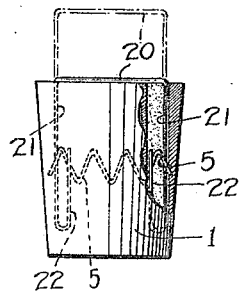

In Fig. 6 we show a cork or stopper 1 of relatively long shape and small transverse diameter. In this form the spiral wire anchoring member 5 is inserted in the manner already explained, transversely of the cork or stopper, and the bail member 20 is formed with elongated arms 21 having extended hook arms 22. The hook arms of this bail or loop are pressed down into the top surface of the cork or stopper through suitable slits formed therein, until the top of the bail rests snugly against the top surface of the cork or stopper. With the bail in this inserted position the anchoring member 5 is screwed into place so as to cause two of the anchoring coils to pass between arms 21 and hook arms 22, of the two bail arms. With this form of the device the cork can be inserted with the extractor bail or loop flat against the top surface of the cork or stopper, and when it is desired to extract the cork the bail or loop 20 is engaged and pulled outwardly to the position indicated in dotted lines, when the bail arms will effectively engage coils of the anchoring device 5 and enable the operator to easily extract the cork or stopper.

Figure 7:
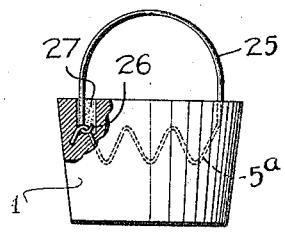

In Fig. 7 we show a slight further modification, in which the extractor bail or loop and the anchoring device are formed of a single continuous piece of wire. In this form of the invention the anchoring member 5ᵃ is first inserted transversely of the cork or stopper, with the bail member 25 projecting from and integrally attached to one end of the anchoring member. The bail 25 is then bent over at the point in connection with the anchoring member at one side of the cork or stopper, and a hook 26, formed on its free end and pressed down through a slit 27 until it springs into engagement with one coil of the anchoring member 5ᵃ, thus completing the connection of the bail with the anchoring member.

Figure 8:
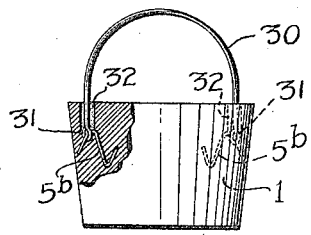

In Fig. 8 we show a further modification of the invention applicable particularly to large corks or stoppers. In this form of the invention the anchoring device is made in two parts, consisting of short sections of spiral spring wire 5ᵇ screwed transversely into the body 1 from opposite sides, and the bail 30 is formed with hooks or eyes 31 pressed into slits 32 in the top of the cork or stopper 1 to engage with the anchoring devices 5ᵇ. The connection of the bail with the anchoring devices in this form may be made either before or after the insertion of the anchoring devices in the same manner as explained in connection with the forms shown in Figs. 1 and 4.

Figure 9:
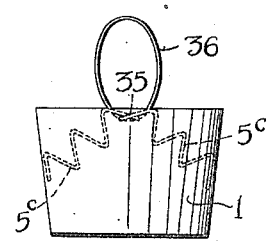

In Fig. 9 we show a further modification in which two anchoring spiral wires 5ᶜ are inserted from opposite sides of the cork or stopper 1 at an angle to the horizontal plane so as to cause the inner ends of the two coils to come to or nearly to the top surface of the cork or stopper, as shown at 35, these intersecting ends of the anchoring wires engaging an extractor bail, loop or ring indicated at 36. In this form the extractor bail is centrally attached to the cork or stopper.

Figure 10:
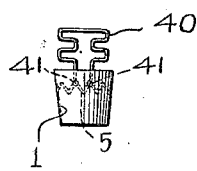

In Fig. 10 we have shown a modification of the invention in which the bail 40 is made of a soft or flexible wire having attaching eyes 41 with which engages the transverse spiral anchor 5, screwed into the cork or stopper 1. This shows the application of the invention to small corks. This form of bail or loop can be easily bent and pressed down against the top surface of the cork or stopper.

It will be observed that in most of the several forms of our invention the extractor bail or loop is attached to the cork or stopper by hinge joints at two or more points, thus making a strong connection which will equally distribute the pull upon the cork or stopper, when it is being extracted from the bottle. The hinge connection and shape of the bail or loop are such that the bail or loop will lie flat against the top surface of the cork for packing. A spiral wire anchoring device is completely embedded and concealed in the body of the cork or stopper and from its nature strengthens, rather than weakens the cork or stopper, since it is screwed through the body of the cork or stopper and tends to bind the parts thereof more closely together. The attachment of the bail to the anchoring device at two or more points, which are relatively widely separated, is important in distributing the strain from the extractor bail or loop throughout the whole body of the cork or stopper. The pull upon the anchoring device being at a plurality of points, does not tend to displace the anchoring device in the body of the cork or stopper as is the case in those constructions having only a single point of attachment between the extractor bail and the anchoring device. In all forms of the invention the spiral wire anchoring member is convolved with the extractor bail, interlocking with the stopper and bail to effectively fasten them together. The spiral anchoring member distributes the strain applied to it throughout a relatively large portion of the stopper and added to this element of strength, it will be observed that said anchoring member embraces within its coils an integral interior portion of the stopper. The construction of the improved extractor is important from a commercial point of view, since it lends itself to the economical manufacture of the device by automatic machinery, which can turn them out at a sufficiently low cost for general use.

What we claim is:

1. The combination of a stopper, with an extractor bail, and a spiral wire anchoring device embedded in the stopper and having its convolutions interlocking with the stopper and bail to fasten them together.

2. The combination of a stopper, with a two-part extractor therefor, comprising a wire bail presented in the stopper and a spiral wire anchoring device screwed into interlocking engagement with the stopper and bail to constitute the sole fastening means between the bail and stopper.

3. The combination of a stopper, with an extractor bail and a spiral wire fastening device screwed into the stopper and having convolutions thereof engaging the extractor bail at two points for securing the bail to the stopper.

4. The combination of a stopper, with an extractor bail having an attaching member presented in the top of the stopper, and a spiral wire fastening device screwed into the stopper convolved with said attaching member for securing the extractor bail to the stopper.

5. The combination of a stopper, with an extractor bail having two attaching members presented in the top of the stopper, and spiral wire anchoring means embedded in the stopper and having convolutions which engage with both attaching members for securing the extractor to the stopper at two points.

6. The combination of a stopper, with an extractor bail, and a compressible anchoring wire spring embedded transversely in the stopper and interlocked with said extractor bail.

7. The combination of a stopper and an extractor bail, with a spiral anchoring member embedded in and embracing within its coils an interior portion of the stopper, and convolved with the extractor bail.

8. The combination of a stopper, with an extractor bail having two arms formed with attaching hooks, the hooks being arranged in the same general plane as the bail, and a spiral wire fastening device screwed transversely into the stopper and having spiral convolutions thereof engaging the hooks of said extractor arms.

9. A stopper having a single piece extractor bail hinged to it at two points below the top surface, the two arms of the bail being bent transversely of the plane of the bail adjacent to the points of attachment to permit the bail to normally lie flat against the top surface of the stopper.

10. The combination of a stopper, with an extractor bail having two arms formed with attaching members, the said arms being bent adjacent to the attaching members transversely to the general plane of the bail, and a spiral wire fastening device screwed transversely into the stopper and having spiral convolutions thereof engaging the attaching members of said extractor arms.

WILLIAM A. DE HART.
JAMES A. WATT.

Witnesses for William A. De Hart:
 WM. E. KNIGHT,
 WM. A. COURTLAND.
Witnesses for James A. Watt:
 NELLIE A. LLOYD,
 J. READ SWEAT.

Copies of this patent may be obtained for five cents each, by addressing the "Commissioner of Patents, Washington, D. C."